United States Patent
Gauerhof et al.

(10) Patent No.: US 10,711,707 B2
(45) Date of Patent: Jul. 14, 2020

(54) METHOD AND DEVICE FOR OPERATING AN INTERNAL COMBUSTION ENGINE

(71) Applicant: Robert Bosch GmbH, Stuttgart (DE)

(72) Inventors: Lydia Gauerhof, Renningen (DE);
Heiko Fahrion, Ostfildern (DE);
Magnus Oppelland, Wendlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/340,527

(22) PCT Filed: Oct. 2, 2017

(86) PCT No.: PCT/EP2017/074928
§ 371 (c)(1),
(2) Date: Apr. 9, 2019

(87) PCT Pub. No.: WO2018/069073
PCT Pub. Date: Apr. 19, 2018

(65) Prior Publication Data
US 2020/0049081 A1    Feb. 13, 2020

(30) Foreign Application Priority Data
Oct. 11, 2016   (DE) .................. 10 2016 219 686

(51) Int. Cl.
*F02D 35/02*   (2006.01)
*F02D 41/28*   (2006.01)
(Continued)

(52) U.S. Cl.
CPC ......... *F02D 35/028* (2013.01); *F02D 35/024* (2013.01); *F02D 41/009* (2013.01);
(Continued)

(58) Field of Classification Search
CPC .... F02D 35/028; F02D 35/024; F02D 41/009; F02D 41/0097; F02D 41/28;
(Continued)

(56) References Cited

U.S. PATENT DOCUMENTS

| 4,691,286 A | * | 9/1987 | Obayashi | ............ G01M 15/046 |
| | | | | 123/436 |
| 5,239,473 A | | 8/1993 | Ribbens et al. | |

(Continued)

FOREIGN PATENT DOCUMENTS

| DE | 10235665 | 2/2004 |
| DE | 102006043064 | 3/2008 |

(Continued)

OTHER PUBLICATIONS

International Search Report dated Jan. 3, 2018 of the corresponding International Application PCT/EP2017/074928 filed Oct. 2, 2017.

*Primary Examiner* — Mahmoud Gimie
(74) *Attorney, Agent, or Firm* — Norton Rose Fulbright US LLP; Gerard Messina

(57) ABSTRACT

A method for ascertaining whether a combustion process is being carried out in a cylinder of an internal combustion engine, it being decided whether or not the combustion process is present as a function of a relative angle between a characteristic signature of a variable characterizing a time curve of a state variable of the internal combustion engine and a specifiable crankshaft angle.

15 Claims, 4 Drawing Sheets

(51) Int. Cl.
*G01M 15/04* (2006.01)
*F02D 41/00* (2006.01)

(52) U.S. Cl.
CPC ......... *F02D 41/0097* (2013.01); *F02D 41/28* (2013.01); *G01M 15/046* (2013.01); *F02D 2041/288* (2013.01); *F02D 2200/024* (2013.01); *F02D 2200/0406* (2013.01); *F02D 2200/101* (2013.01); *F02D 2250/14* (2013.01)

(58) Field of Classification Search
CPC ......... F02D 2041/288; F02D 2200/024; F02D 2200/0406; F02D 2200/101; F02D 2250/14; G01M 15/046
USPC .......................................................... 701/102
See application file for complete search history.

(56) References Cited

U.S. PATENT DOCUMENTS

| | | | | |
|---|---|---|---|---|
| 5,241,480 A | * | 8/1993 | Takaku | G01M 15/11 701/111 |
| 5,373,732 A | * | 12/1994 | Kuroda | G01M 15/11 73/114.04 |
| 5,689,065 A | * | 11/1997 | Kuroda | G01M 15/046 73/114.04 |
| 5,747,681 A | * | 5/1998 | Kuroda | G01M 15/11 73/114.04 |
| 6,334,094 B1 | * | 12/2001 | Hirakata | F02D 41/0097 702/145 |
| 6,598,468 B2 | | 7/2003 | Zur Loye et al. | |
| 2009/0259383 A1 | | 10/2009 | Wang et al. | |
| 2009/0282903 A1 | | 11/2009 | Nagano et al. | |
| 2009/0312931 A1 | | 12/2009 | Wang et al. | |
| 2010/0258081 A1 | * | 10/2010 | Tanaya | F02P 5/1502 123/406.58 |

FOREIGN PATENT DOCUMENTS

| | | |
|---|---|---|
| DE | 102008057508 | 7/2009 |
| DE | 102015102249 | 8/2016 |

* cited by examiner

METHOD AND DEVICE FOR OPERATING AN INTERNAL COMBUSTION ENGINE

FIELD OF THE INVENTION

The present invention relates to methods for ascertaining whether a combustion process in an internal combustion engine has taken place, methods for operating an internal combustion engine, a computer program, and a control and/or regulating device for carrying out the method, as well as a machine-readable storage medium on which the computer program is stored.

BACKGROUND INFORMATION

From U.S. Pat. No. 6,924,737 B2, a method is known in which, using a voltage of a voltage-generating internal combustion engine, it is ascertained whether or not the internal combustion engine is running.

SUMMARY OF THE INVENTION

In contrast thereto, the method having the features described herein has the advantage that even for individual combustion processes it can be ascertained whether or not these processes are taking place. Therefore, the method is particularly precise. In addition, the method requires only sensor equipment that is already present in an internal combustion engine, and is therefore usable with a particularly low outlay.

SUMMARY OF THE INVENTION

In a first aspect, a method is provided with which it is ascertained whether a combustion process is being carried out in a cylinder of an internal combustion engine, in particular of a motor vehicle. The method first makes use of a state variable that may characterize a combustion process in the cylinder. The method supplies particularly good results if this state variable is an energy. In order to enable this energy to be ascertained particularly simply with the best possible precision, it may include a kinetic energy given by the rotational movement of the internal combustion engine. This kinetic energy is given in the inertial system of the internal combustion engine, and thus for example includes precisely the kinetic energy that results due to the rotational movement of the crankshaft and the kinetic energy of those movements of parts of the internal combustion engine that are coupled with the rotational movement of the crankshaft (and not, in contrast, the kinetic energy lent to the internal combustion engine by the movement of the motor vehicle).

For particularly good results, the energy may include a rotational energy of the crankshaft and a kinetic energy of the up-and-down movement of pistons of the internal combustion engine.

A further improvement of the precision, with a moderate additional outlay, can be achieved alternatively or in addition if the energy also includes a volume work of the gas filling present in the cylinder.

In addition, the method makes use of a characteristic signature of the time curve of this state variable. Here, as a function of a relative (phase) angle (which can be in particular a crankshaft angle, but also for example a camshaft angle), about which the characteristic signature is displaced relative to a specifiable, but fixed, crankshaft angle, it is decided whether or not the combustion process is present. The specifiable crankshaft angle can for example be a top dead center of the cylinder.

In a particularly simple development, the characteristic signature is a characteristic value, in particular a maximum, of a time curve of a Fourier component of the state variable. This Fourier component may be the Fourier component having the period that corresponds to a combustion frequency (or, in externally ignited internal combustion engines, the ignition frequency) of the internal combustion engine. In the following, this Fourier component is also designated "ignition frequency Fourier component."

In the amplitude spectrum, it can be seen that, in the operating state, the frequency is equal to the greatest amplitude of the ignition frequency. This relationship is due to the fact that the ignition of the fuel and its subsequent combustion take place periodically with the ignition frequency, and therefore the rotational energy of the crankshaft increases with the ignition frequency.

In a particularly simple development of one of the methods named above, it can be decided that the combustion process has taken place if the phase shift is within a specifiable crankshaft angular range around the specifiable crankshaft angle, i.e. if the crankshaft angle is within the crankshaft angle range.

This method is quite particularly simple if the crankshaft angle range is situated symmetrically about the specifiable crankshaft angle.

It can then be further provided that one of the above-named methods is used to ascertain whether or not a combustion process is present, and the internal combustion engine can then be controlled as a function of the result of this ascertaining.

In further aspects, the present invention relates to a computer program that is set up to carry out the method, i.e. all steps of the method, to a machine-readable storage medium on which the computer program is stored, and to a control device that is set up to carry out the method, i.e. all steps of the method.

In the following, specific embodiments of the present invention are explained in more detail with reference to the accompanying drawings.

DETAILED DESCRIPTION

Figure 1:
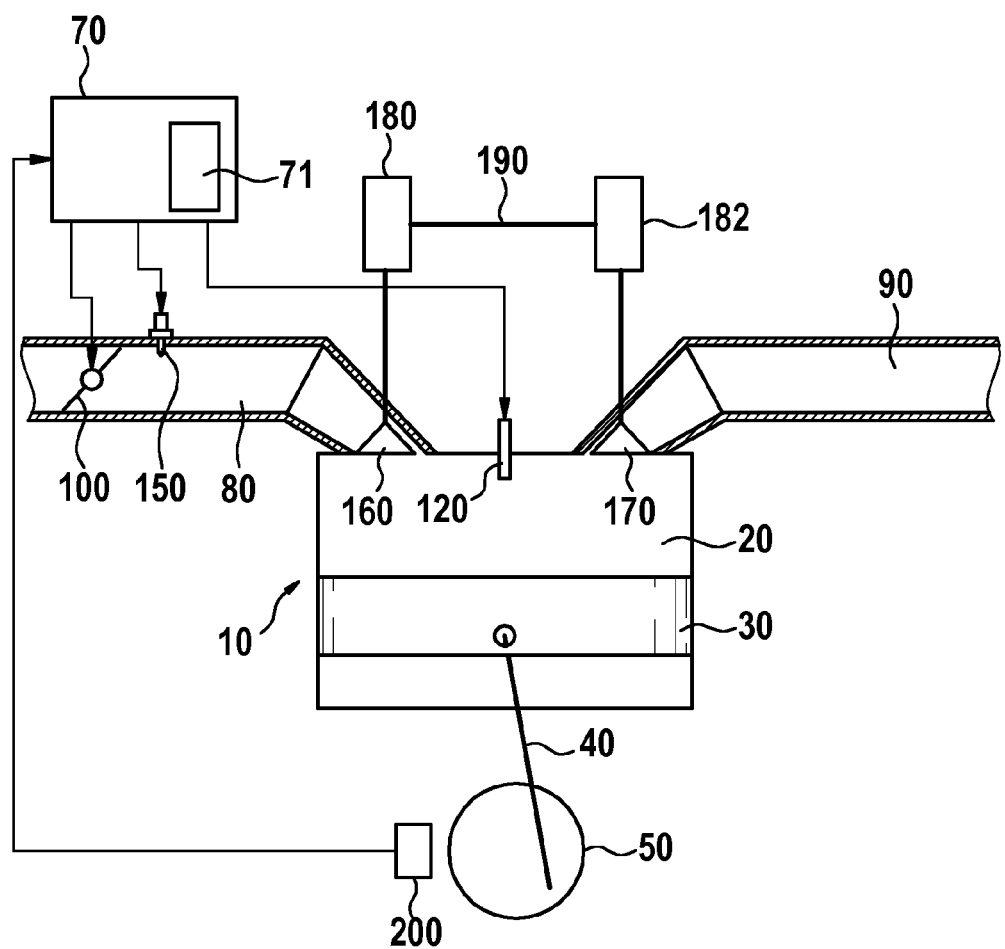
FIG. 1 schematically shows a configuration of an internal combustion engine.

FIG. 1 shows, as an example, the configuration of an internal combustion engine, here for example an externally ignited gasoline internal combustion engine, having intake manifold injection, of a motor vehicle. In a combustion chamber 20 of a cylinder 10, a combustion of an air-fuel mixture takes place in a known manner. The fuel is injected into an intake manifold 80 via an injection valve 150, and is supplied to combustion chamber 20 via an inlet valve 160. The quantity of air is set via a throttle valve 100, and is also supplied to combustion chamber 20 via intake manifold 80 and inlet valve 160. A spark plug 120 there ignites the air-fuel mixture, and in this way moves a piston 30 downwards, thereby driving a crankshaft 50 via a connecting rod 40. In the exhaust stroke, the air combusted in this way is expelled from piston 30 via an outlet valve 170 to an exhaust tract 90. A camshaft 190 has cams 180, 182 by which inlet valve 160 and outlet valve 170 are controlled in a known manner. The controlling of throttle valve 100, injection valve 150, spark plug 120, and, if warranted, of the variable valve drive can take place using an engine control device 70 on which the method according to the present invention can also be carried out. Engine control device 70 receives, in a known manner, a signal from a rotational angle sensor 200 that codes tooth times of a sensor wheel (not shown) that is connected in rotationally fixed fashion to crankshaft 50.

Typically, the controlling, and the method according to the present invention, can be realized by a computer program that is stored for example on a machine-readable storage medium 71. Machine-readable storage medium 71 can be contained in engine control device 70.

Figure 2:
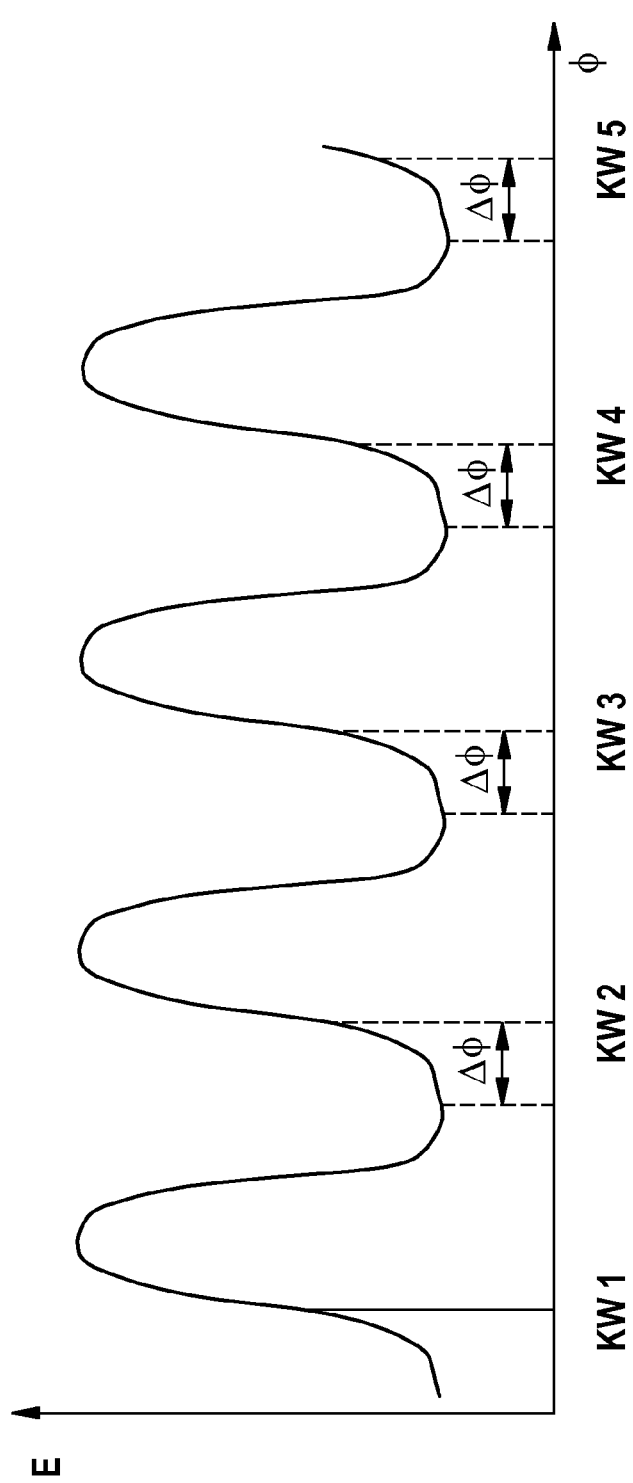
FIG. 2 shows examples of time curves of an energy value and of a piston stroke.

FIG. 2 schematically shows a time curve of an energy E, for example for the case of a four-cylinder internal combustion engine. In this example, energy E corresponds to the stored mechanical work in all four cylinders of the internal combustion engine. At crankshaft angles KW1, KW2, KW3, KW4, KW5, each of the cylinders of the internal combustion engine runs through a top dead center TDC, here specifically their upper ignition dead center, i.e. the dead center in the transition from the exhaust stroke to the working stroke. Displaced by a relative phase angle $\Delta\Phi$, the curve of the energy E assumes a minimum value. This relative phase angle $\Delta\Phi$ is equal in all the minima shown in the example. However, it can also assume a different value in each minimum.

Figure 3:
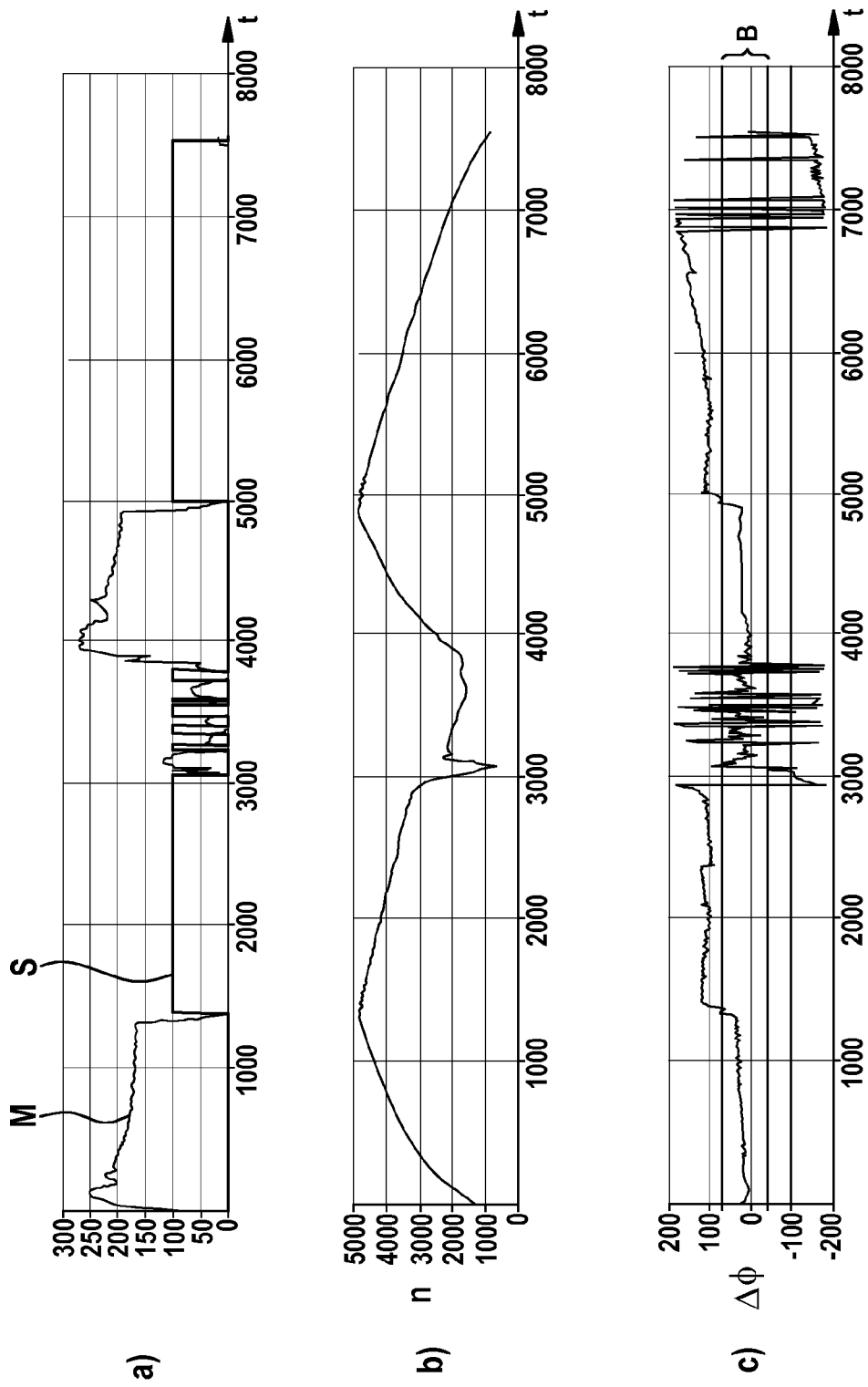
FIG. 3 shows examples of time curves of various state variables of an internal combustion engine and of the relative phase angle.

FIG. 3c illustrates the time curve of the relative phase angle $\Delta\Phi$ in a real example. For illustration, in FIG. 3a time curve of a torque M generated by the internal combustion engine is plotted (broken line), and the curve of a signal S (solid line) is plotted that assumes a low value when the internal combustion engine is operating and a high value when the ignition of the internal combustion engine is not operating. FIG. 3b shows a time curve of a rotational speed of the internal combustion engine.

As shown in FIG. 3c, the relative phase angle $\Delta\Phi$ is within a region B, with very good selectivity, when the internal combustion engine is operating, and is outside this region B when the internal combustion engine is not operating.

Figure 4:
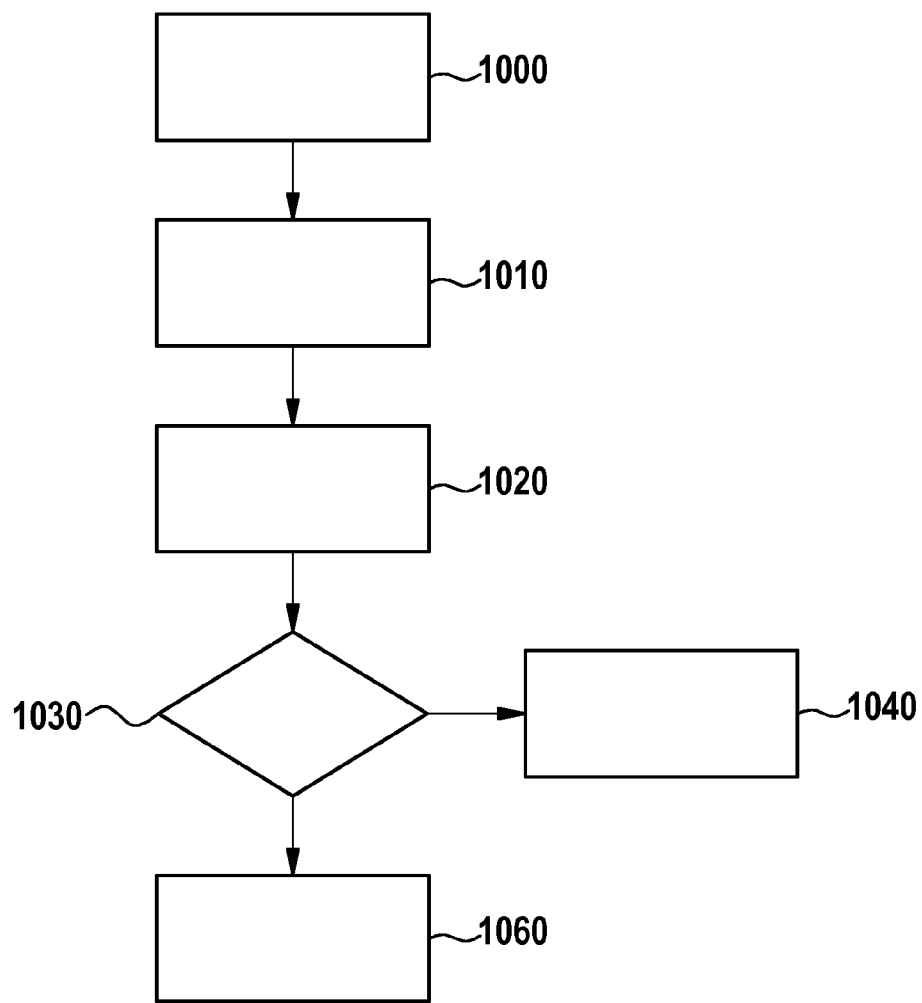
FIG. 4 shows a flow diagram of a specific embodiment of the present invention.

Therefore, FIG. 4 shows, as an example, a sequence of the method. In step 1000, control device 70 receives from rotational angle sensor 200 a signal that corresponds to tooth times of the sensor wheel. From this, the rotational speed n of the internal combustion engine is ascertained. In addition, the angular position $\Phi$ of the crankshaft is ascertained via a tooth gap of the sensor wheel.

Energy E is calculated as $$E = Erot + Eosz + Ecomp.$$

The energy terms Eosz, Ecomp can be ascertained as the sum of the corresponding contributions over all cylinders of the internal combustion engine, or can be ascertained separately for each cylinder.

Here, Erot is a kinetic rotational energy ascertained as $$Erot = \tfrac{1}{2}\theta_{rot}n^2,$$

where $\theta_{rot}$ is a specifiable constant that corresponds to the moment of inertia of crankshaft 50 and of the parts connected in rotationally fixed fashion thereto.

Eosz is a kinetic energy that is derived from the up-and-down movement of piston 30. It is ascertained as $$Eosz = \tfrac{1}{2}m_{osz}v_K^2.$$

$m_{osz}$ is a specifiable constant that corresponds to the mass of the parts that move up and down with piston 30. $v_K$ is the speed of the up-and-down movement of the respective piston 30 and cylinder 10. It is ascertained as $$v_K = n \cdot f(\phi),$$

f is a function of the angular position $\Phi$ that is stored for example in a characteristic map.

Ecomp is the mechanical work that is performed by the compression and expansion of the gas contained in cylinder 10. It is ascertained as $$Ecomp = \frac{1}{\kappa - 1}(p_2 V_2 - p_1 V_1).$$

Here p is the cylinder pressure and V is the volume of cylinder 10 above piston 30. Subscripts 1, 2 here stand for a first time and a second time between which this compression work Ecomp is done. K is a specifiable variable that corresponds to the isotrope exponent of the gas contained in the cylinder. In particular, K may be ascertained as a function of a temperature and/or a pressure of the ambient air. The volume V is read out for example from a table, as a function of angular position $\Phi$, and pressure p is derived from the general gas equation. The initial time corresponding to subscript 1 can correspond to the time at which the corresponding inlet valve 160 is closed. At this time, pressure p corresponds approximately, except for a correction term specifiable in a table, to the pressure in intake manifold 80, which is ascertained for example by an intake manifold pressure sensor. Of course, it is also possible to ascertain pressure p using a cylinder pressure sensor.

In the following step 1010, the calculated curve of energy E is transformed from the time domain into the frequency domain over a specifiable time space, for example half a working cycle. The phase axis in the frequency domain is selected such that the dead center position corresponds to a predefined phase angle. This can take place for example using so-called synchros at which internal combustion engine 70, with the aid of the signal of rotational speed sensor 200, ascertains that the phase position corresponds to a specifiable phase angle.

In the following step 1020, the phase angle is ascertained that indicates the ignition frequency Fourier component in the amplitude spectrum. In the case of a discrete Fourier analysis, this can for example be the component whose period corresponds to the quotient w/Z of the angular range of a working cycle w and the number Z of (operating) cylinders. The phase angle ascertained in this way is the relative phase angle $\Delta\Phi$, due to the selection of the phase axis.

In the following step 1030, it is ascertained whether the relative phase angle $\Delta\Phi$ is within the specifiable region B. If this is the case, there follows step 1040, in which it is decided that cylinder 10 is operating, i.e. that the internal combustion engine is switched on. If this is not the case, there follows step 1060, in which it is decided that cylinder 10 is not operating, i.e. that the internal combustion engine is switched.

With this, the method ends.

What is claimed is:

1. A method for ascertaining whether a combustion process is being carried out in a cylinder of an internal combustion engine, the method comprising:
   determining a time curve of an ascertained energy of the internal combustion engine; and
   deciding whether the combustion process is present as a function of a relative angle between: (i) a characteristic signature of a variable characterizing the determined time curve of the ascertained energy of the internal combustion engine, and (ii) a specified crankshaft angle of a crankshaft;
   wherein the ascertained energy includes a kinetic energy given by the rotational movement of the internal combustion engine, and wherein the determining of the time curve includes ascertaining a kinetic rotational energy of the crankshaft and ascertaining a kinetic energy of an up-and-down movement of at least one piston of the internal combustion engine.

2. The method of claim 1, wherein the characteristic signature is a characteristic value of a time curve of a Fourier component, the energy.

3. The method of claim 1, wherein it is decided that the combustion process has taken place if the relative angle is within a specified crankshaft angular range around the specified crankshaft angle.

4. The method of claim 3, wherein the crankshaft angular range is situated symmetrically about the specified crankshaft angle.

5. The method of claim 1, wherein the ascertained energy also includes an ascertained volume work of the gas filling in the cylinder.

6. The method of claim 1, wherein the specified crankshaft angle is a top dead center of the cylinder.

7. The method of claim 1, wherein the specified crankshaft angle being a value in an interval having an initial value and an end value, the initial value being one of the values 110°, 90°, and 75°, and the end value being one of the values 70°, 60°, and 50°.

8. The method as recited in claim 1, wherein the ascertained energy includes a sum of the ascertained kinetic rotational energy of the crankshaft and the ascertained kinetic energy of the up-and-down movement of the at least one piston of the internal combustion engine.

9. The method as recited in claim 1, wherein the determining of the time curve further includes ascertaining mechanical work performed by compression and expansion of gas contained in the cylinder of the internal combustion engine, and wherein the ascertained energy includes a sum of the ascertained kinetic rotational energy of the crankshaft, the ascertained kinetic energy of the up-and-down movement of the at least one piston of the internal combustion engine, and the ascertained mechanical work performed by the compression and expansion of the gas contained in the cylinder of the internal combustion engine.

10. A method for operating an internal combustion engine, the method comprising:
    ascertaining whether a combustion process is being carried out in a cylinder of an internal combustion engine, by performing the following:
       determining a time curve of an ascertained energy of the internal combustion engine;
       deciding whether the combustion process is present as a function of a relative angle between: (i) a characteristic signature of a variable characterizing the determined time curve of the ascertained energy of the internal combustion engine, and (ii) a specified crankshaft angle of a crankshaft;
       wherein the ascertained energy includes a kinetic energy given by the rotational movement of the internal combustion engine, and wherein the determining of the time curve includes ascertaining a kinetic rotational energy of the crankshaft and ascertaining a kinetic energy of an up-and-down movement of at least one piston of the internal combustion engine; and
    controlling the internal combustion engine as a function of the result of the ascertaining of whether the combustion process is being carried out.

11. The method as recited in claim 10, wherein the ascertained energy includes a sum of the ascertained kinetic rotational energy of the crankshaft and the ascertained kinetic energy of the up-and-down movement of the at least one piston of the internal combustion engine.

12. The method as recited in claim 10, wherein the determining of the time curve further includes ascertaining mechanical work performed by compression and expansion of gas contained in the cylinder of the internal combustion engine, and wherein the ascertained energy includes a sum of the ascertained kinetic rotational energy of the crankshaft, the ascertained kinetic energy of the up-and-down movement of the at least one piston of the internal combustion engine, and the ascertained mechanical work performed by the compression and expansion of the gas contained in the cylinder of the internal combustion engine.

13. A non-transitory computer readable medium having a computer program, which is executable by a processor, comprising:
    a program code arrangement having program code for ascertaining whether a combustion process is being carried out in a cylinder of an internal combustion engine, by performing the following:
       determining a time curve of an ascertained energy of the internal combustion engine; and
       deciding whether the combustion process is present as a function of a relative angle between: (i) a characteristic signature of a variable characterizing the determined time curve of the ascertained energy of the internal combustion engine and a specified crankshaft angle, and wherein the determining of the time curve includes ascertaining a kinetic rotational energy of the crankshaft and ascertaining a kinetic energy of an up-and-down movement of at least one piston of the internal combustion engine;
       wherein the ascertained energy includes a kinetic energy given by the rotational movement of the internal combustion engine.

14. The computer readable medium of claim 13, wherein the characteristic signature is a characteristic value of a time curve of a Fourier component, the energy.

15. A control and/or regulating device, comprising:
    a controller device configured for ascertaining whether a combustion process is being carried out in a cylinder of an internal combustion engine, by performing the following:
       determining a time curve of an ascertained energy of the internal combustion engine; and
       deciding whether the combustion process is present as a function of a relative angle between: (i) a characteristic signature of a variable characterizing the determined time curve of the energy of the internal combustion engine, and (ii) a specified crankshaft angle;

wherein the ascertained energy includes a kinetic energy given by the rotational movement of the internal combustion engine, and wherein the determining of the time curve includes ascertaining a kinetic rotational energy of the crankshaft and ascertaining a kinetic energy of an up-and-down movement of at least one piston of the internal combustion engine.

\* \* \* \* \*